United States Patent [19]

Robinson

[11] 4,123,596
[45] Oct. 31, 1978

[54] CATHODE STRUCTURE FOR SODIUM SULPHUR CELLS

[75] Inventor: Graham Robinson, Chester, England

[73] Assignee: Chloride Silent Power Limited, London, England

[21] Appl. No.: 821,107

[22] Filed: Aug. 2, 1977

[30] Foreign Application Priority Data

Mar. 2, 1977 [GB] United Kingdom ............... 4534/77

[51] Int. Cl.$^2$ ........................................ H01M 10/39
[52] U.S. Cl. .................................................. 429/104
[58] Field of Search ............... 429/104, 30, 31, 218, 429/235

[56] References Cited

U.S. PATENT DOCUMENTS

| 3,982,959 | 9/1976 | Partridge et al. | 429/163 |
| 4,011,367 | 3/1977 | Evaus et al. | 429/104 |
| 4,017,663 | 4/1977 | Breault | 429/12 |
| 4,038,464 | 7/1977 | Baukal et al. | 429/104 |

Primary Examiner—Anthony Skapars
Attorney, Agent, or Firm—Beveridge, DeGrandi, Kline & Lunsford

[57] ABSTRACT

In a sodium sulphur cell having a cathodic region containing sulphur/polysulphides forming a cathodic reactant between a solid electrolyte and a cathode current collector, the electronically conductive matrix containing the cathode reactant is formed of a porous metal structure, preferably metal fibres, coated with graphite or carbon to form an electronically conductive protective coating.

11 Claims, 3 Drawing Figures

CATHODE STRUCTURE FOR SODIUM SULPHUR CELLS

BACKGROUND OF THE INVENTION

1. Field of the Invention

This invention relates to a cathode electrode structure for a sodium sulphur cell.

In a sodium sulphur cell, a solid electrolyte material separates molten sodium, forming the anode, from a sulphur/polysulphide cathodic reactant. In such a cell the solid electrolyte is a material, such as betaalumina, which conducts sodium ions. On discharge of the cell, the sodium gives up electrons at the anodic interface of the solid electrolyte and the sodium ions pass through the solid electrolyte into the cathode adjacent the electrolyte. In the cathodic region, these sodium ions have to combine with sulphide ions to form a sodium polysulphide. The electrons pass through the sodium to the anode current collector and thence around an external circuit to a cathode current collector, e.g. a carbon or graphite tube or rod, in the cathodic reactant. The electrons must pass from this cathode current collector to the region of the cathode adjacent the surface of the solid electrolyte where they react with the sulphur to form sulphide ions. The sulphide ions and sodium ions form a polysulphide. The electronic conductivity of molten sulphur is low and hence it is the practice to pack the cathodic region with a fibrous carbon or graphite material which provides the required electronic conductivity.

2. Prior Art

Carbon or graphite has been used for this packing because of the highly corrosive nature of the cathodic reactant comprising molten sulphur and sodium polysulphides, which reactant, when the cell is in operation, is typically at a temperature of the order of 350°. Metals such as stainless steel are corroded in this environment. The carbon or graphite may be in the form of loose fibres or the fibres may be in the form of a felt or a woven cloth; another form of carbon which has been employed is reticulated vitreous carbon. The carbon or graphite material has to form a matrix, through which the liquid cathodic reactant can move. The polysulphides formed by the electrochemical reaction have to be transferred away from the neighbourhood of the electrolyte on discharge of the cell and have to be transferred to this region on charging of the cell. The matrix however must constitute an electronic conductor to transfer electrons from the reaction zone to the cathode current collector when charging the cell and to provide the required electronic current path between the cathode current collector and the regions near the surface of the electrolyte where the sulphide ions have to be formed on discharge of the cell.

Examples of the use of graphite or vitreous carbon as a conductive matrix material in the cathode electrode of a sodium sulphur cell are shown in U.S. Pat. Nos. 3,966,492, 3,980,496, 3,985,575 and 4,002,807. As is explained in U.S. Pat. No. 3,993,503, certain advantages can be obtained by utilising two different materials, disposed in different parts of the cathodic region. One, for use in charging the cell, is preferentially wetted by the sulphur and the other, for use on discharge, is preferentially wetted by the polysulphides. For the former material, it is proposed to use graphite felt or foam on porous graphite or vitreous carbon foam or pyrolytic graphite felt or foam or other unspecified materials covered or coated with such felt or foam. The material to be preferentially wetted by the polysulphides must essentially have surface properties differing from those of carbon or graphite; they may for example be oxide materials. Such materials, in general, are even less conductive than carbon or graphite and one of the problems with the use of two different materials, one effective during charging and the other effective during discharge of the cell, is the reduction in overall conductance in the cathodic region.

SUMMARY OF THE INVENTION

It is one of the objects of the present invention to provide an improved form of cathode structure in a sodium sulphur cell. More particularly, it is an object to provide a much more highly conductive matrix material which will withstand the corrosive conditions in the cathodic region of a sodium sulphur cell.

According to this invention, in a sodium sulphur cell having a cathodic region containing sulphur/polysulphides forming the cathodic reactant between a solid electrolyte and a cathode current collector, there is provided a porous packing to form an electronic conductor which packing is constituted at least partly of a porous metal structure, e.g. a metal fibre material or a porous metal material coated with graphite or carbon forming an electronically conductive protective coating.

Metal with a carbon or graphite coating has a very much better electronic conductivity than the graphite or carbon felt or fiber material used on its own such as has been the common practice in sodium sulphur cells. One of the major advantages of sodium sulphur cells, compared with batteries in common use at the present day, is the ability to provide a very large output current per unit volume of cell. The conductance of the carbon matrix material in the cathodic region constitutes one of the limitations on the performance of sodium sulphur cells. The use of a carbon or graphite coated metal matrix in a cathodic region enables a substantially higher electronic conductivity to be obtained compared with the use of graphite or carbon fibres or felt yet, by the use of this coated material, the matrix is still able chemically to withstand the highly corrosive condition in the cathodic region of the cell.

The matrix material may comprise, for example, steel wool coated with graphite or carbon. A preferable form of construction is to have a substrate of chromium alloy, for example a nickel-chromium alloy such as that known under the Trade Mark "Nichrome" or a nickel-chromium iron alloy such as that known under the Trade Mark "Inconel". Such a material has quite a high resistance to corrosion in the cathodic reactant if there should be any flaws in the carbon or graphite coating. Obviously, however, other metals may be employed. A higher conductance may be obtained using aluminium fibres as the substrate. Composite constructions may be employed, for example aluminium or copper fibres with an interface layer, conveniently of nickel-chromium alloy, between the substrate and the carbon or graphite coating to give further protection for the substrate.

In another form of construction, a porous metal structure, for example a porous nickel element, is coated with carbon or graphite. Such a porous nickel element may be similar to the porous electrodes used in fuel cells where a gaseous reactant has to be fed into the cell at the electrodes surface. Dual or multiple-porosity structures, as known in the fuel cell art, and coated with carbon as described above, may be employed. A rigid metal matrix with a carbon coating may be combined with carbon or graphite felt to provide flexibility to assist assembly or to provide a less active, more resistive layer close to the electrolyte surface.

The carbon or graphite coating might be applied to loose fibres which may then be employed as the matrix in the sodium sulphur cell. The fibres may be randomly oriented or they may be oriented in a direction of preferred conductance, e.g. axially or radially in a cylindrical cell. The fibres, after coating with carbon or graphite may be needled to form a felt similar to the known types of carbon or graphite felt. Sodium sulphur cells are commonly of cylindrical form with the cathodic reactant in an annular region either inside or outside the electrolyte tube. A felt as described above may be inserted into such an annular region in the form of washers or it may be bent into a cylinder or cylinders or wrapped helically within or around the electrolyte tube or laid in the form of a strip extending longitudinally along the surface of the electrolyte tube.

The coating of the substrate with carbon may be effected using known carbon deposition techniques, for example a chemical vapour deposition technique. It may be preferred in some cases to deposit two or more superposed layers of carbon on the substrate. In some cases, one or more intermediate layers of other material or materials may be deposited on the substrate before applying an outer carbon layer or layers.

Such an intermediate layer may be used, for example, for ease of fabrication or to obtain better adherence despite differences in coefficients of thermal expansion of the carbon and the substrate. If the metal fibres are of a good conductor, such as aluminium or copper, which is readily attacked chemically by the cathodic reactant, an intermediate layer of a material having greater resistance to corrosion, e.g. an iron-nickel-cobalt alloy may be put over the aluminium or copper. The carbon or graphite layer and the intermediate layer are, in this case, of such thickness as to form an impermeable protective coating.

The above-described carbon or graphite coated material may in some cases be mixed with an electrically non-conductive material, for example in the manner described in the specification of co-pending U.S. application Ser. No. 768,929, filed Feb. 15, 1977, to form a composite matrix.

DESCRIPTION OF THE PREFERRED EMBODIMENT

Figure 1:
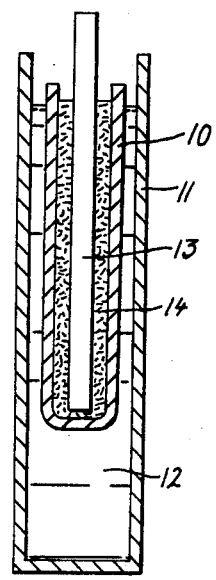
FIG. 1 illustrates diagrammatically a sodium sulphur cell.

FIG. 1 illustrates diagrammatically a sodium sulphur cell having a solid electrolyte tube 10, formed of betaalumina, which tube is closed at one end and supported in a metal case 11 constituting the anode current collector. Sodium 12 fills the annular space around the electrolyte tube 10. Inside this tube is a graphite rod 13 forming the cathode current collector. The space between the rod 13 and electrolyte tube 10 is packed with a porous structure 14 forming an electronically conductive matrix which is filled initially with sulphur. The cell is operated at a temperature, typically 300° C. to 400° C., at which the sodium and sulphur are molten.

The present invention is concerned more particularly with the porous structure 14. In this embodiment, this structure is formed by packing into the annular region fibres of graphite-coated metal fibres. The metal is preferably a nickel-chromium alloy such as that sold under the Trade Mark "Nichrome" but other materials may be used, e.g. a nickel-chromium-iron alloy such as that sold under the Trade Mark "Inconel". Aluminium or copper may be used with an interface of nickel chromium alloy between the substrate and the carbon or graphite. Staple fibres are used of a length of a few centimeters and preferably between 10 and 100 microns diameter.

The fibres may be packed into the cell as randomly oriented loose fibres but preferably they are needled to form a felt similar in form to the carbon and graphite felts already known for use in sodium sulphur cells. In another arrangement, the fibres are woven into a cloth which is stacked or folded to the required thickness. If it is formed into a felt having a porosity of about 80 to 95% which is that of conventional carbon or graphite felts, this material will have substantially greater bulk conductance than conventional carbon or graphite felts. Using nickel-chromium or nickel-chromium-iron fibres the improvement in conductance is about tenfold, with aluminium fibres, the conductance is about one hundred times that of carbon fibres.

The felt may be inserted into an annular cathodic region of a sodium sulphur cell in the known way, for example in the form of washers, or a sheet bent into a cylinder or wrapped helically within or around the electrolyte tube or in the form of strips, preferably of trapezoidal section, laid over the surface of the electrolyte tube parallel to the axis thereof. The matrix material may be impregnated with molten sulphur after insertion in the cell or an electrode assembly may be formed of the matrix material impregnated with sulphur, which assembly is then inserted in the cell.

The felt density or fibre thickness may be graded across the electrode region to control the distribution of the reaction rate. Metallic felt may be used in combination with carbon or graphite felt to produce more pronounced gradations in conductance or activity.

If loose fibres are used, they may be packed into the cell before sulphur impregnation. The loose fibres may however be moulded with molten sulphur into the required shape for incorporation into the electrode and cooled to solidify the assembly before putting this assembly into the cell.

Figure 2:
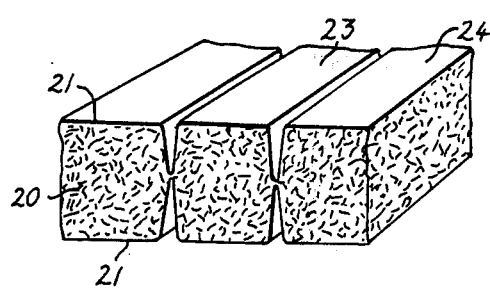
FIG. 2 is a perspective diagram showing a part of a cathode matrix structure.

If loose fibres are used, it is convenient to sandwich these fibres between layers of a thin cloth, conveniently a woven cloth. FIG. 2 illustrates such an assembly with loose fibres 20 sandwiched between thin sheets of a woven cloth 21. The sandwich typically is 1 to 10 mm thick. This facilitates handling of the matrix assembly and, in particular, facilitates compression of the fibres when packing the assembly into a cell.

Figure 3:
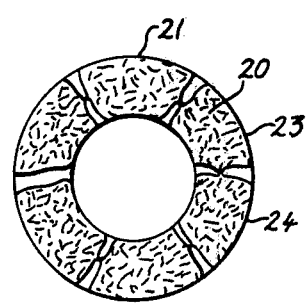
FIG. 3 is a diagram illustrating how the structure of FIG. 2 is formed into an annular shape.

By sandwiching the loose fibres between cloth, the structural integrity of a needled felt can be obtained. In some cases, however, it may be preferred to needle the coated fibres. Conveniently as shown in FIGS. 2 and 3, this composite is formed into a number of elongate elements, such as elements 23, 24, joined along their length by the layers of cloth 21 so that the assembly can be formed into an annular unit to fit within the cell. The assembly may be impregnated with sulphur before or after putting it in the cell.

The woven cloth 21 may be formed from carbon fibres or metallic fibres or of an insulating material such as the alumina material sold under the Trade Mark "Saffil" or it may be formed of a mixture of materials.

By using nickel-chromium alloy fibres having a bulk resistivity of 0.1 ohm core, compared with about 1 ohm cm of a graphite felt, in a typical cylindrical electrode, 3 cm in diameter and 7 mm in annular width, a threefold increase in conductance of the composite electrode is obtained.

I claim:

1. In a sodium sulphur cell having a cathodic region containing sulphur/polysulphides forming a cathodic reactant between a solid electrolyte and a cathode current collector, a porous packing in the cathodic region forming an electronic conductor impregnated with the cathodic reactant, which packing is constituted at least partly of a porous metal structure coated with graphite or carbon forming an electronically conductive protective coating over the metal.

2. A sodium sulphur cell as claimed in claim 1 wherein said porous metal structure comprises metal fibres.

3. In a sodium sulphur cell having a cathodic region containing sulphur/polysulphides forming a cathodic reactant between a solid electrolyte and a cathode current collector; a porous packing in the cathodic region forming an electronic conductor impregnated with the cathodic reactant, which packing extends between the solid electrolyte and the cathode current collector and is formed at least partly of metal fibres, each fibre having a coating of graphite or carbon over the whole surface of the metal to constitute an electronically conductive protective coating.

4. A sodium sulphur cell as claimed in claim 3 wherein the metal fibres comprise steel wool.

5. A sodium sulphur cell as claimed in claim 3 wherein the metal fibres comprise fibres of a chromium-containing alloy.

6. A sodium sulphur cell as claimed in claim 3 wherein the metal fibres comprise fibres of nickel-chromium alloy.

7. A sodium sulphur cell as claimed in claim 3 wherein the metal fibres comprise fibres of a nickel-chromium-iron alloy.

8. A sodium sulphur cell as claimed in claim 3 wherein the metal fibres comprise fibres of aluminium.

9. A sodium sulphur cell as claimed in claim 3 wherein the fibres are packed, as a loose fibre packing, into the cathodic region of the cell.

10. A sodium sulphur cell as claimed in claim 9 wherein the fibres are randomly oriented.

11. A sodium sulphur cell as claimed in claim 3 wherein the fibres are in the form of fibres needled into a felt after they have been coated with carbon or graphite.

* * * * *